(12) United States Patent
Gädke et al.

(10) Patent No.: US 11,685,349 B2
(45) Date of Patent: Jun. 27, 2023

(54) METHOD FOR SUPPRESSING BRAKING NOISE, CENTRAL SERVER, VEHICLE CONTROL MODULE, AND STORAGE MEDIUM

(71) Applicant: Continental Teves AG & Co. oHG, Frankfurt am Main (DE)

(72) Inventors: Martin Gädke, Frankfurt am Main (DE); Michael Vogt, Frankfurt am Main (DE); Uwe Bach, Frankfurt am Main (DE); Arne Beckhaus, Frankfurt am Main (DE); Simon Heinz, Frankfurt am Main (DE); Mustafa Mentes, Frankfurt am Main (DE); Michael Labuda, Frankfurt am Main (DE); Jonathan Stone, Frankfurt am Main (DE); Ignacio Garro, Frankfurt am Main (DE); Vigneshwar Kalyanasundaram, Frankfurt am Main (DE)

(73) Assignee: Continental Teves AG & Co. oHG

( * ) Notice: Subject to any disclaimer, the term of this patent is extended or adjusted under 35 U.S.C. 154(b) by 627 days.

(21) Appl. No.: 16/630,682

(22) PCT Filed: Jun. 27, 2018

(86) PCT No.: PCT/EP2018/067272
§ 371 (c)(1),
(2) Date: Jan. 13, 2020

(87) PCT Pub. No.: WO2019/020301
PCT Pub. Date: Jan. 31, 2019

(65) Prior Publication Data
US 2021/0086733 A1   Mar. 25, 2021

(30) Foreign Application Priority Data

Jul. 28, 2017   (DE) ..................... 10 2017 213 056.3

(51) Int. Cl.
*G06F 7/70* (2006.01)
*B60T 8/172* (2006.01)
(Continued)

(52) U.S. Cl.
CPC ............ *B60T 8/172* (2013.01); *B60T 8/1766* (2013.01); *B60T 8/321* (2013.01); *B60T 17/221* (2013.01);
(Continued)

(58) Field of Classification Search
CPC ........ B60T 8/172; B60T 8/1766; B60T 8/321; B60T 17/221; B60T 8/1705;
(Continued)

(56) References Cited

U.S. PATENT DOCUMENTS 9,415,757 B2   8/2016   Martinotto et al.
9,475,500 B2   10/2016   Grimm et al.
(Continued)

FOREIGN PATENT DOCUMENTS

CN   101489822 A   7/2009
CN   105190081 A   12/2015
(Continued)

OTHER PUBLICATIONS

Japanese Office Action for Japanese Application No. 2019-569969, dated Dec. 23, 2020, with English summary, 6 pages.
(Continued)

*Primary Examiner* — Shardul D Patel
(74) *Attorney, Agent, or Firm* — RatnerPrestia

(57) ABSTRACT

A method for suppressing braking noise in a vehicle by a central server, methods for suppressing braking noise in a vehicle to be carried out in a vehicle, and an associated central server, an associated vehicle control module and an associated data storage medium are disclosed. The data
(Continued)

processing is divided between the vehicle and the central server.

16 Claims, 2 Drawing Sheets

(51) Int. Cl.
*B60T 8/1766* (2006.01)
*B60T 8/32* (2006.01)
*B60T 17/22* (2006.01)
*G07C 5/00* (2006.01)
*B60T 8/17* (2006.01)

(52) U.S. Cl.
CPC ............ *G07C 5/008* (2013.01); *B60T 8/1705* (2013.01); *B60T 8/3235* (2013.01); *B60T 17/228* (2013.01); *B60T 2220/02* (2013.01); *B60T 2220/04* (2013.01); *B60T 2270/60* (2013.01)

(58) Field of Classification Search
CPC .. B60T 8/3235; B60T 17/228; B60T 2220/02; B60T 2220/04; B60T 2270/60; B60T 8/00; B60T 7/18; B60T 17/22; B60T 2201/124; B60T 2270/406; B60T 8/885; G07C 5/008; G07C 5/08; B60W 2540/30; B60W 40/09; B60Y 2306/09; B60Y 2400/81; B60Y 2200/10; B60Y 2200/30; G06F 7/70
USPC .......................................................... 701/70
See application file for complete search history.

(56) References Cited

U.S. PATENT DOCUMENTS

| | | | | |
|---|---|---|---|---|
| 9,937,074 | B2* | 4/2018 | Manzo | ..................... A61N 1/30 |
| 2006/0202555 | A1* | 9/2006 | Kingston | ............ F16D 65/0012 |
| | | | | 303/191 |
| 2006/0273658 | A1 | 12/2006 | Halassy-Wimmer et al. | |
| 2007/0230665 | A1* | 10/2007 | Narayanasamy | ... F16D 65/0012 |
| | | | | 378/196 |
| 2012/0053805 | A1* | 3/2012 | Dantu | ................... B60W 40/09 |
| | | | | 701/70 |
| 2016/0009295 | A1* | 1/2016 | Chun | ................... A61B 5/6893 |
| | | | | 701/32.9 |
| 2016/0082936 | A1 | 3/2016 | Langen et al. | |
| 2018/0211520 | A1 | 7/2018 | Offenhaeuser et al. | |
| 2018/0319405 | A1* | 11/2018 | Heinze | ................ B60W 30/143 |

FOREIGN PATENT DOCUMENTS

| | | |
|---|---|---|
| DE | 19947903 A1 | 8/2000 |
| DE | 102013211856 A1 | 12/2014 |
| DE | 102014007797 A1 | 11/2015 |
| DE | 102015119495 A1 | 5/2016 |
| DE | 102016200759 A1 | 5/2017 |
| EP | 1626885 A1 | 2/2006 |
| JP | 2002195915 A | 7/2002 |
| JP | 2018502639 A | 2/2018 |
| JP | 2018529146 A | 10/2018 |
| WO | 2005016718 A1 | 2/2005 |
| WO | 2012140945 A1 | 10/2012 |

OTHER PUBLICATIONS

Korean Office Action for Korean Application No. 10-2020-700143, dated Jan. 20, 2021 with partial translation, 9 pages.
Chinese Office Action for Application No. 201880049183.2, dated Jun. 25, 2021 with translation, 16 pages.
Japanese Decision to Grant a Patent for Japanese Application No. 2019-569969 dated Jul. 14, 2021, with translation, 3 pages.
German Search Report for German Application No. 10 2017 213 056.3, with partial translation, dated Jul. 5, 2018, 7 pages.
International Search Report and Written Opinion for International Application PCT/EP2018/067272, dated Sep. 11, 2018, 10 pages.

* cited by examiner

METHOD FOR SUPPRESSING BRAKING NOISE, CENTRAL SERVER, VEHICLE CONTROL MODULE, AND STORAGE MEDIUM

CROSS REFERENCE TO RELATED APPLICATIONS

This application is the U.S. National Phase Application of PCT International Application No. PCT/EP2018/067272, filed Jun. 27, 2018, which claims priority to German Patent Application No. 10 2017 213 056.3, filed Jul. 28, 2017, the contents of such applications being incorporated by reference herein.

FIELD OF THE INVENTION

The invention relates to a method for suppressing braking noise in a number of vehicles by means of a central server, methods for suppressing braking noise in a vehicle, a central server, an associated vehicle control module and a non-volatile computer-readable storage medium.

BACKGROUND OF THE INVENTION

Vehicles, in particular motor vehicles or rail-bound vehicles, usually have braking systems which are used for decelerating the vehicle. Braking noise can occur in many operating situations and can be perceived as unpleasant by vehicle occupants or even persons outside the vehicle. Therefore, procedures have already been developed which a vehicle-integrated control unit can use to suppress braking noise.

For example, the document WO 2005/016718 A1, incorporated herein by reference, discloses a method for suppressing or preventing the production of noise during activation of a brake. The method allows, for example, the distribution of the braking force over the different wheels of the vehicle to be varied.

According to the known prior art, it is typically necessary for a software installed in the vehicle to make decisions to suppress noise, wherein the parameters which indicate the presence of noise must be defined in advance. This means that the software initiates an appropriate routine if known input signals indicate a noise event. For this purpose, appropriate tests are typically carried out during the development of vehicles.

A disadvantage of the known designs is that noise events and responses must be defined in advance, which makes it no longer possible to respond in a flexible way to noise events occurring in the actual operation of the vehicle.

SUMMARY OF THE INVENTION

An aspect of the invention provides methods for suppressing braking noise, which are improved, for example more flexible, compared to designs in accordance with the prior art. In addition, it is an object of the invention to provide a central server and a vehicle control module for carrying out such a method. A further aspect of the invention is a non-volatile computer-readable storage medium with program code for executing such a method.

This is achieved according to an aspect of the invention by means of methods, a vehicle control module and a non-volatile storage medium according to the respective main claims. Advantageous refinements can be gathered, for example, from the respective dependent claims. The content of the claims is incorporated in the content of the description by express reference. Since the braking noise behavior is directly related to the tribological condition of the cooperating components of a motor vehicle's (disk) brake, by way of example the disclosure, the content and the features of the following previous patent families and/or patent applications of the applicant are hereby incorporated by reference: EP 1626885 B1; DE 199 47 903 A1. This is the case because the subject matter of the above patent families includes an appropriate brake conditioning and brake regeneration in which, in particular, an online data exchange has been suggested, at least implicitly.

An aspect of the invention relates to a method for suppressing braking noise in a number of vehicles by means of a central server, the method comprising the following steps:

receiving a number of messages from the vehicles, wherein the messages contain braking state data, and generating a number of response instructions based on the braking state data, wherein each response instruction contains a measure for suppressing braking noise.

By means of the method according to an aspect of the invention at least part of the braking noise suppression can be relocated to a central server, which enables a more flexible response to events or noises occurring. In particular, the central server can be responsible for a multiplicity of vehicles or a plurality of vehicles, for example, of a manufacturer or a fleet of vehicles. The central server allows vehicles to be monitored from a central point even during their operation, and response instructions also to be specified based on data which are only produced during the operation of vehicles.

Braking noise typically consists of noises that occur when activating the brakes of the vehicle. These are typically sounds that are audible to human hearing. The braking noise can be produced, in particular, by standard vehicle braking systems which are based on disk brakes or drum brakes, but also by other or additional vehicle braking systems such as retarder brakes, engine braking or eddy-current brakes.

It should be noted that the messages may additionally also include data from a hands-free microphone, any other type of microphone installed in the vehicle, a crash sensor, an airbag control device, an acceleration sensor, a rain sensor, or in general CAN-bus data or else other data available in the vehicle. Such data can be interpreted as braking state data, they can be part of the messages in addition to the braking state data, or they can also be contained in the messages instead of the braking state data. This can be understood as an independent aspect of the invention.

The response instructions are intended to be transferred to one or more vehicles where they are used to support the suppression of braking noise. The response instructions may also contain general measures for the improvement of quality, comfort and/or performance of a vehicle condition. This can be, for example, a suppression or modification of a braking noise, for example by changing the braking force distribution between front and rear axle, or else an increase in the brake response performance by detection of the braking state, for example on a wet road surface due to rain. Other measures for improving the quality, comfort or performance of a vehicle may form an integral part of the response instructions. In particular, if these are independent of braking noise this can be interpreted as an independent aspect of the invention.

The response instructions can be generated by means of a deep learning method, for example. This has been found to be advantageous for typical applications.

The method preferably also comprises at least one of the following steps:
- sending the response instructions to the vehicles,
- sending the response instructions to a group of vehicles,
- installing the response instructions in new vehicles to be produced.

When sending the response instructions to the vehicles, the response instructions are sent in particular to those vehicles from which the messages with the braking state data were also received. However, the response instructions can also be sent to a group of vehicles, wherein the vehicles of this group can be different or only partially identical to those from which the messages with the braking state data were received.

It should be noted that the above steps can be combined with one another in arbitrary ways or in any sub-combinations. This also applies to other itemized lists which are included in this application.

In accordance with a refinement, a number of driving profiles are generated based on the braking state data, each driving profile containing a number of response instructions for braking noise suppression for a particular driving style. Such driving profiles can be used to be able to apply braking noise suppression in typical or regularly recurring situations, in particular in the case of specific behaviors or driving styles of drivers.

In the case of a vehicle, in particular a motor vehicle, which is manually controlled by a driver, a driving profile can be a driver profile, in particular. However, a driving profile can also be more generally related to the driving style of an autonomously or semi-autonomously driven vehicle, including a self-driving motor vehicle, a rail-bound vehicle or a people mover.

It is understood that the generation of driving profiles can be carried out independently of the generation of response instructions and can thus also be understood as an independent aspect of the invention.

The method preferably comprises at least one of the following steps:
- sending the driving profiles to the vehicles,
- sending the driving profiles to a group of vehicles,
- installing the driving profiles in new vehicles to be produced.

This allows the driving profiles to be distributed to vehicles in a similar way as that already described earlier with regard to the response instructions. Reference is made to the above comments in this regard.

An aspect of the invention also relates to a method for suppressing braking noise in a vehicle, the method comprising the following steps:
- recording a number of braking state data,
- sending the braking state data to a central server in a number of messages,
- receiving a number of response instructions from the central server, wherein each response instruction includes a measure for suppressing braking noise, and
- applying the response instructions in a number of braking operations of the vehicle.

The method just described, which is executed in a vehicle, corresponds to the method described above, which is executed in a central server. The vehicle sends the braking state data to the central server and receives the response instructions accordingly, which it can apply to the suppression of braking noise. This results in the advantages described above. In particular, it allows a much more flexible response to different situations or driving styles or even changes due to wear or vehicle modifications.

The method to be executed in a vehicle can be applied, in particular, in conjunction with a method described above, to be executed in a server. Reference is made to all of the above comments in this regard.

An aspect of the invention also relates to a method for suppressing braking noise in a vehicle, the method comprising the following steps:
- receiving a number of driving profiles from a central server or reading out a number of driving profiles from a non-volatile memory of the vehicle, each driving profile containing at least one driving style and an associated response instruction, each of which contains a measure for suppressing a braking noise,
- identifying a driving style based on driving state data,
- mapping the determined driving style to a driving style of one of the driving profiles, thereby selecting this driving profile, and
- applying the response instructions of the selected driving profile in a number of braking operations of the vehicle.

This method allows a flexible adaptation of the procedures to driving styles of drivers in the prevention of braking noise or else in terms of general quality, comfort or performance features. Therefore, in particular, the driving profiles already described above can be applied, wherein the corresponding response instructions of the driving profile are used which best suit the driving style.

The mapping of the identified driving style to a driving style of one of the driving profiles may mean, in particular, that a check is carried out to determine which of the driving styles of the existing or known driving profiles has the most matches and/or fewest differences with respect to the driving style which was identified based on the driving state data. As a result, a driving profile can be selected which best corresponds to the driving style of the respective driver. This method can, in particular, also be combined with the method described above with the direct use of response instructions. With regard to the driving profiles, reference is made in particular to the above statements.

The road condition data can be, for example, data relating to speed, acceleration, rotation speeds, braking force, deceleration, thrust or their respective first or second derivatives. This makes it possible to characterize driving styles.

If the identified driving style cannot be mapped to any driving style of a driving profile, a signal is preferably output which indicates, in particular, a service interval reduction and/or a use of other components. This allows those drivers to be taken into account who have a driving style that differs significantly from the usual or commonly found driving styles.

The signal can be issued to a driver as an optical or acoustic signal, for example, or it can be sent as a message to a vehicle manufacturer or a workshop, for example, via mobile radio or Car-to-X communication, or it can be stored in a fault data memory. As mentioned above, the signal can indicate, for example, that service intervals should be shortened or other, for example more robust, components should be used. This can be used to ensure that the vehicle is better equipped for an unusual style of driving.

In particular, a central server as described above can be used as the central server. In this context, it is possible to revert to all the embodiments and variants described herein.

An aspect of the invention also relates to a method, which is executed in a central server and a vehicle simultaneously. In doing so, reference can be made to all embodiments and variants described herein with regard to the methods to be carried out in a vehicle or a central server.

The messages can be received and/or transmitted in particular via mobile radio. Other transmission technologies, such as Car-to-X communication or a connection to a WLAN network, in particular in a garage or at another home location of the vehicle, can also be used.

The braking state data preferably include data relating to one or more of the following states:
noise,
braking noise,
vibrations,
braking forces,
braking force distribution,
wheel rotation speeds,
pedal travel,
pedal force,
braking torque,
deceleration,
temperatures, in particular of brakes, engine and/or environment; and/or they include CAN bus data.

It should be understood that, in principle, all data available in the vehicle can be included in the braking state data, wherein the data just mentioned have been shown to be particularly advantageous for the suppression of braking noise.

A respective response instruction preferably contains a measure for suppressing braking noise as a function of a number of braking states. This may include, in particular, the braking state data in the vehicle being acquired and processed while driving or during braking, and the appropriate measure for suppressing a braking noise can be applied depending on the result.

A respective preferred response instruction preferably contains one or more of the following measures, which in principle may be combined with each other in any desired way:
braking force distribution,
braking force reduction,
braking force modulation,
brake conditioning+brake regeneration (so-called "brake disk cleaning")
brake maintenance, brake repair and/or wear parts replacement.

Such countermeasures have proved advantageous for the prevention or suppression of braking noise in typical situations. The implementation of a brake conditioning or brake regeneration can include, for example, an automatic communication with an action instruction directed to the driver, and/or directed to a competent motor vehicle workshop and/or directed to a motor vehicle control electronics, to repair or maintain the motor vehicle braking system of the particular motor vehicle. For example, alternatively or in addition, a brake conditioning and hence brake regeneration can be carried out automatically according to the model from the incorporated prior art. In this context, for example, a specifically controlled or regulated activation of the motor vehicle brake detected as defective is carried out.

In accordance with one refinement, the method in the vehicle or in the central server additionally comprises the following step:
identifying a robustness measure for a component by means of the braking state data.

Such a robustness measure can provide information as to how robustly a component, for example a brake disk, a brake shoe, a hydraulic cylinder or any other part of the braking system, but also any other part of the vehicle, reacts to braking operations and what amount of wear is to be expected.

An aspect of the invention also relates to a central server, which is configured to carry out a method as described above with reference to a central server. The invention also relates to a vehicle control module, which is configured to carry out a method as described above with reference to a vehicle. An aspect of the invention also relates to an arrangement having such a central server and such a vehicle control module. Moreover, an aspect of the invention relates to a non-volatile, computer-readable data storage medium which contains program code, during the execution of which a processor carries out a method described herein. In regard to the respective methods, reference can be made to all of the embodiments and variants described herein.

In general, it should be noted that by means of the measures described herein different application cases can be responded to in a highly flexible way. For example, data can be recorded and evaluated and can be used to derive conclusions at as close to real-time speed as possible. The data to be recorded, for example, can be derived from a continuous series production monitoring process or from a series production vehicle used by the customer. For example, in one case, the data can be used to adjust the vehicle characteristics. For example, as part of a braking noise suppression that can also be used in series operation, the aim is to enable the system to learn when a braking noise occurs, in order then to suppress it with appropriate countermeasures. In another case, for example, data from production may be available. For example, if enough data are available from different brake designs from a series production monitoring and/or from series production vehicles in the field, then a software can generate a suggestion as to which design will be the most robust, for example, against noise events in future vehicles.

In particular, different signals, for example, sensor signals and/or existing signals such as CAN-bus signals can be collected by a software and transmitted to a receiver via a mobile transmission device, such as an LTE module or a UMTS module. This receiver can forward the data to a memory or a central server, for example, in particular as described above, or to a cloud server. These data can be evaluated in real-time, for example by a machine algorithm or a deep learning software. If this software were to detect that, for example, a noise event is imminent, it can send back an appropriate piece of information to the vehicle, which can then apply, for example, a known strategy in order to contribute to the noise prevention in a manner which is individually matched to the current state. On the other hand, the software existing in the vehicle can be updated continually by means of the measures described herein and therefore, for example in the event of a signal interruption to the central server, the data stored in the vehicle or programs can be used as a fallback.

The existing data can be used, for example, to create realistic driving profiles of the users. Thus, for example, it is possible to create a usage profile which covers, for example, the driving behavior of 99% of the drivers. A new product to be developed can then be designed for this group of users, for example. This allows unnecessarily high design criteria, which can make a product disproportionately more expensive, to be avoided. The final one percent of users can then be filtered out, for example, using the data analysis and referred for a shorter service interval or upgrading with more robust components.

Another example application is the comparison of different data sets, for example as already described. Thus it is possible, for example, to compare data sets that characterize a specially tailored component for a vehicle type or are obtained from the production of the component, for example, with the user data of the vehicle and to provide an estimate of the robustness of this combination. If this is carried out for a plurality of vehicle types, on the basis of these data a proposal can be made for the design of new components. For example, these can be designed to be especially robust against wear or the occurrence of noise.

A mobile data collection also enables a large number of potential applications. For example, it is possible to carry out a real-time evaluation of vehicle data, for example, in combination with a real-time response in order to adjust vehicle parameters accordingly. It is possible to respond flexibly to different types of new situations by using the deep-learning optimization method and so vehicle parameters can be adjusted. By comparison of different data sets, new and more robust products can be developed. By means of user profiles or driving profiles obtained, more cost-effective products can be produced.

The methods described herein and other measures can be used in particular in motor vehicles such as cars, buses or trucks, but also in vehicles in general, such as people movers, rail vehicles, in aircraft such as airplanes or in water-borne vessels such as ships.

Data, such as sensor data, can be transmitted from a vehicle, for example, via a mobile radio network. From the mobile radio receiver, the data can be forwarded to a central server. The data can be analyzed by the server, for example using a deep learning software. A corresponding data set can be sent back to the vehicle by the software over the entire chain. The vehicle can preferably evaluate the data set and initiate appropriate measures.

A piece of hardware can be used, for example, to acquire the sensor data and CAN data. A corresponding module can also be fitted with an appropriate transmitting unit for mobile data transfer.

BRIEF DESCRIPTION OF THE DRAWINGS

Further features and advantages of aspects of the invention will be gathered by a person skilled in the art from the exemplary embodiments described below with reference to the appended drawing.

These show.

DETAILED DESCRIPTION OF THE PREFERRED EMBODIMENTS

Figure 1:
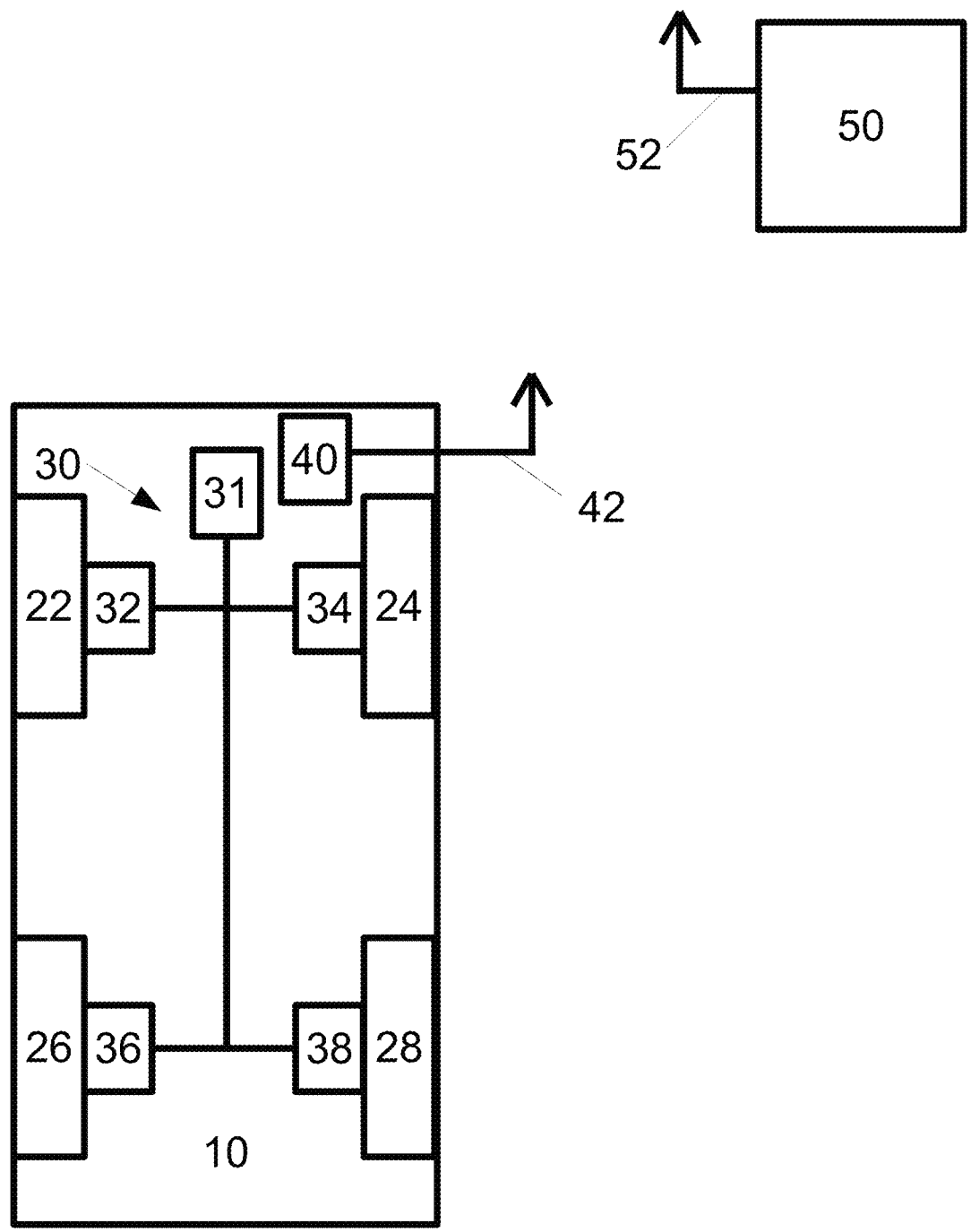
FIG. 1: a vehicle and a central server.

FIG. 1 shows a schematic diagram of a vehicle in the form of a motor vehicle 10 and a central server 50. These are each designed for carrying out methods according to an aspect of the invention in accordance with relevant exemplary embodiments.

The motor vehicle 10 has a left-hand front wheel 22, a right-hand front wheel 24, a left-hand rear wheel 26 and a right-hand rear wheel 28. The motor vehicle 10 also comprises a braking system 30. This has a central unit 31, which is designed to generate a braking pressure. This can be, for example, a hydraulic pump and/or a brake cylinder with an attached brake pedal. The braking system 30 further comprises a left front brake unit 32, a right front brake unit 34, a left rear brake unit 36 and a right rear brake unit 38. The brake units 32, 34, 36, 38 are each assigned to one of the wheels 22, 24, 26, 28 to decelerate the respective wheel.

The motor vehicle 10 also comprises a vehicle control module 40, which is connected to a vehicle antenna 42. This enables the vehicle control module 40 to participate in mobile radio communication.

The vehicle control module 40 is designed to carry out a method according to an aspect of the invention in accordance with an exemplary embodiment. For this purpose the vehicle control module 40 is connected to a CAN bus, not illustrated, of the motor vehicle 10, which is in turn connected to a plurality of sensors, not shown. These are, in particular, noise sensors and acceleration sensors, which are installed in airbag control modules.

Based on the available data in the CAN bus the vehicle control module 40 generates braking state data when the vehicle 10 is braked by means of the braking system 30. These braking state data provide information about the intensity and other parameters of the braking action, as well as about any resultant noise. The braking state data is packaged into messages by the vehicle control module 40, which it sends to the central server 50 via a mobile radio network, not shown. This server is connected to a stationary antenna 52, which enables the participation in mobile radio communication. This is best understood schematically. It is taken as read that the central server 50 can be connected, for example to the Internet or to another network, which allows a data exchange with the motor vehicle 10 via a connection to a mobile radio network, via an interface for Car-to-X communication or via WLAN.

The central server 50 is designed to carry out a method in accordance with an exemplary embodiment of the invention. To achieve this it evaluates the received braking state data and derives response instructions from them by means of a deep learning algorithm. Such response instructions each contain an instruction as to how to respond to specific braking states of the motor vehicle 10 in order to suppress braking noise. This can include, for example, reducing or modulating the brake pressure or implementing a specific distribution of brake pressures to the wheels 22, 24, 26, 28.

Furthermore, the central server 50 also generates driving profiles in the form of driver profiles, which are based on data collected from multiple motor vehicles. In these, typical driving styles are detected which are frequently used by drivers to control motor vehicles 10. This allows a classification of drivers into particular driving styles and response instructions can be assigned in each case which match the respective driving style, i.e., which allow an optimal suppression of braking noise in the respective driving style.

The response instructions and the driver profiles are transmitted from the central server 50 back to the motor vehicle 10 via mobile radio communication. There, they can be used for the suppression of braking noise. For example, in the case of certain braking states a suitable response instruction which has been generated by the central server 50 can be used in order to suppress braking noise. In addition, a driving style of a driver can be detected based on dynamic driving data, and a driver profile that corresponds to it can be selected. The response instructions contained therein can then preferably be used.

Figure 2:
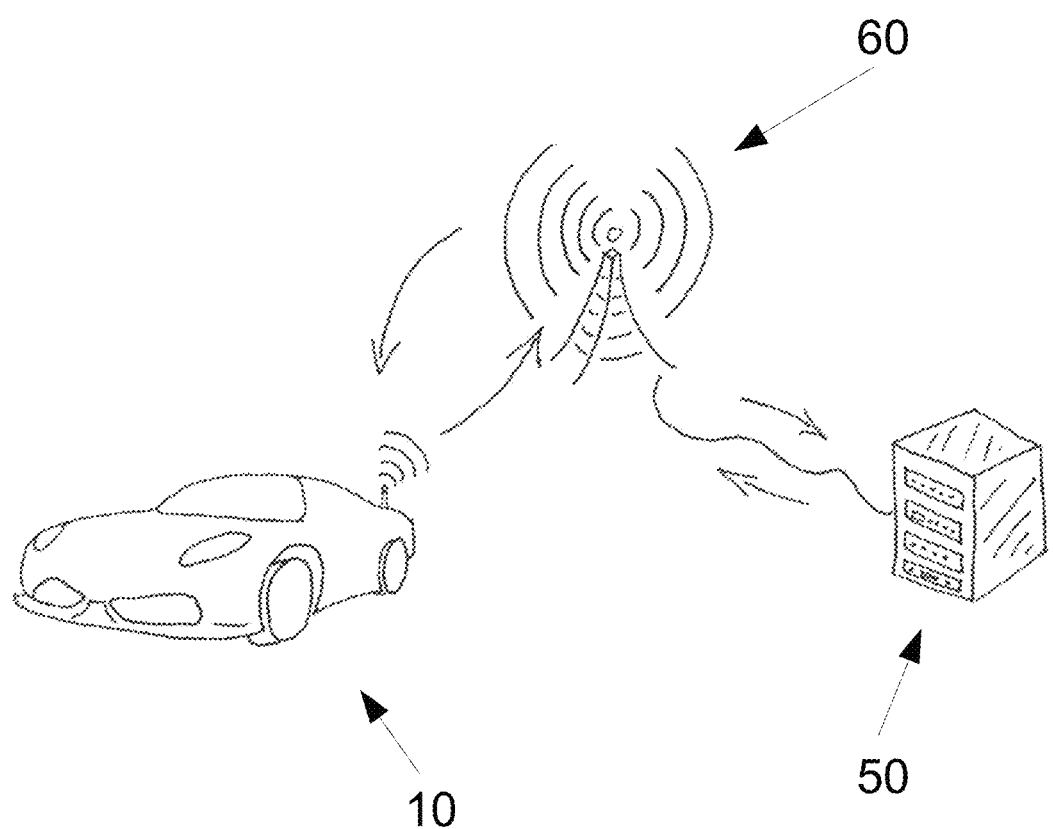
FIG. 2: a vehicle, a central server and a wireless network.

FIG. 2 shows a purely schematic diagram of a possible communication between the motor vehicle 10 and the central server 50. A schematically represented mobile radio network 60 is used for this purpose. Both the motor vehicle 10 and the central server 50 are connected to the mobile radio network 60, the central server 50 having a direct wired network connection and the motor vehicle 10 being subscribed to the mobile network. This enables the data exchange already described with reference to FIG. 1 in an advantageous way.

Figure 3:
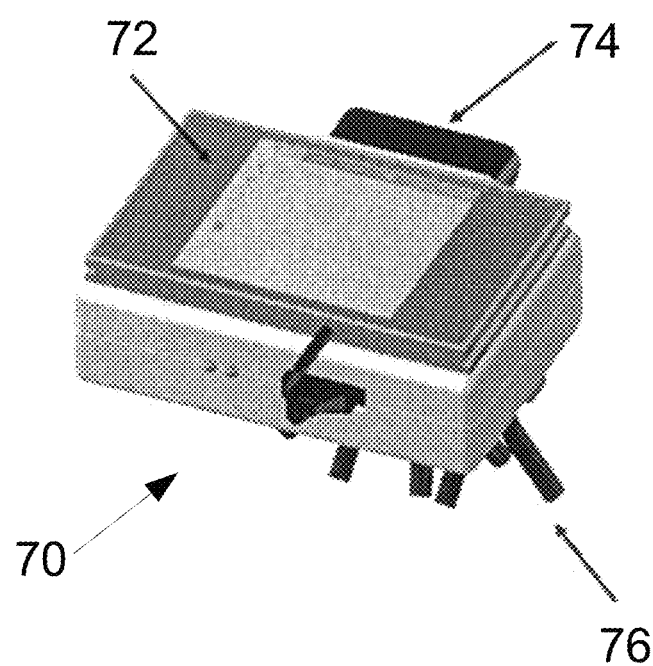
FIG. 3: a vehicle transmitting and receiving unit.

FIG. 3 shows a vehicle transmitting and receiving unit 70. This is a schematic representation, wherein the transmitting and receiving unit 70 comprises a display 72 for displaying information, a connection 74 for connecting to an OBD (On Board Diagnostics) port, and a plurality of cable outlets 76 to additional sensors. Such a unit 70 can preferably be used in the context of a method according to an aspect of the invention.

The mentioned steps of the method according to an aspect of the invention can be executed in the indicated order. However, they can also be executed in a different order. In one of its embodiments, for example with a specific combination of steps, the method according to an aspect of the invention can be executed in such a way that no further steps are executed. However, in principle, further steps can also be executed, even steps of a kind which have not been mentioned.

The claims that are part of the application do not represent any renouncement of the attainment of further protection.

If it turns out in the course of proceedings that a feature or a group of features is not absolutely necessary, then the applicant aspires right now to a wording for at least one independent claim that no longer has the feature or the group of features. This may be, by way of example, a subcombination of a claim available on the filing date or may be a subcombination of a claim available on the filing date that is limited by further features. Claims or combinations of features of this kind requiring rewording are intended to be understood to be covered by the disclosure of this application as well.

It should further be pointed out that configurations, features and variants of aspects of the invention that are described in the various embodiments or exemplary embodiments and/or shown in the figures are combinable with one another in any way. Single or multiple features can be interchanged with one another in any way. Combinations of features arising therefrom are intended to be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance essential to an aspect of the invention. They can therefore also be individually included in claims for the purpose of distinction from the prior art.

The invention claimed is:

1. A method for suppressing braking noise in a number of vehicles by a central server,
wherein the method comprises:
receiving a number of messages from the vehicles, wherein the messages contain braking state data,
generating a plurality of driving profiles based on the braking state data, each driving profile containing a number of response instructions for braking noise suppression for a respective different driving style, and
applying the number of response instructions of one of the plurality of driving profiles based on the braking state data, wherein each response instruction contains a measure for suppressing braking noise and thereby causes the vehicle to perform a modified braking operation having suppressed noise.

2. The method as claimed in claim 1, which also comprises at least one of:
sending the response instructions to the vehicles,
sending the response instructions to a group of vehicles,
installing the response instructions in new vehicles to be produced.

3. The method as claimed in claim 1, which also comprises at least one of:
sending the driving profiles to the vehicles,
sending the driving profiles to a group of vehicles,
installing the driving profiles in new vehicles to be produced.

4. A method for suppressing braking noise in a vehicle, wherein the method comprises:
recording a number of braking state data,
sending the braking state data to a central server in a number of messages,
generating a plurality of driving profiles based on the braking state data, each driving profile containing a number of response instructions for braking noise suppression for a respective different driving style,
receiving the number of response instructions of one of the plurality of driving profiles from the central server, wherein each response instruction includes a measure for suppressing braking noise, and
applying the response instructions in a number of braking operations of the vehicle,
wherein the central server as claimed in claim 1 is used as the central server.

5. The method as claimed in claim 1,
wherein the messages are received and/or transmitted via mobile radio.

6. The method as claimed in claim 1,
wherein the braking state data include data relating to one or more of the following states:
noise,
braking noise,
vibrations,
braking forces,
braking force distribution,
wheel rotation speeds,
pedal travel,
pedal force,
braking torque,
deceleration,
temperatures, in particular of brakes, engine and/or environment;
and/or wherein they include CAN bus data.

7. The method as claimed in claim 1,
wherein a respective response instruction contains a measure for suppressing braking noise as a function of a number of braking state data.

8. The method as claimed in claim 1,
wherein a respective response instruction contains one or more of the following actions:
braking force distribution,
braking force reduction,
braking force modulation,
brake conditioning and/or braking regeneration.

9. The method as claimed in claim 1,
which also comprises in the vehicle or in the central server:
identifying a robustness measure for a component by the braking state data.

10. A central server which is configured to carry out a method as claimed in claim 1.

11. A non-volatile, non-transitory computer-readable data storage medium, containing program code which, when carried out, causes a processor to execute a method as claimed in claim 1.

12. A method for suppressing braking noise in a vehicle, wherein the method comprises:
- recording a number of braking state data,
- sending the braking state data to a central server in a number of messages,
- generating a plurality of driving profiles based on the braking state data, each driving profile containing a number of response instructions for braking noise suppression for a respective different driving style,
- receiving the number of response instructions of one of the plurality of driving profiles from the central server, wherein each response instruction includes a measure for suppressing braking noise, and
- applying the response instructions in a number of braking operations of the vehicle.

13. A vehicle control module which is configured to execute a method as claimed in claim 12.

14. A method for suppressing braking noise in a vehicle, wherein the method comprises:
- receiving a number of driving profiles from a central server or reading out a number of driving profiles from a non-volatile memory of the vehicle, each driving profile containing at least one different driving style and an associated response instruction, each of which contains a measure for suppressing a braking noise,
- identifying a driving style based on driving state data,
- mapping the determined driving style to a driving style of one of the driving profiles, thereby selecting this driving profile, and
- applying the response instructions of the selected driving profile in a number of braking operations of the vehicle.

15. The method as claimed in claim 14,
wherein if the identified driving style cannot be mapped to any driving style of a driving profile, a signal is output which indicates a service interval reduction and/or a use of other components.

16. A vehicle control module which is configured to execute a method as claimed in claim 14.

* * * * *